United States Patent
Fujita et al.

(10) Patent No.: US 7,230,795 B2
(45) Date of Patent: Jun. 12, 2007

(54) RECORDING MEDIUM HAVING REDUCED SURFACE ROUGHNESS

(75) Inventors: Minoru Fujita, Tokyo (JP); Shuichi Okawa, Tokyo (JP); Mitsuru Takai, Tokyo (JP)

(73) Assignee: TDK Corporation, Tokyo (JP)

( * ) Notice: Subject to any disclaimer, the term of this patent is extended or adjusted under 35 U.S.C. 154(b) by 420 days.

(21) Appl. No.: 10/808,406

(22) Filed: Mar. 25, 2004

(65) Prior Publication Data

US 2004/0190201 A1 Sep. 30, 2004

(30) Foreign Application Priority Data

Mar. 27, 2003 (JP) ............... 2003-088408

(51) Int. Cl.
*G11B 5/72* (2006.01)
*G11B 5/83* (2006.01)

(52) U.S. Cl. ................... 360/135; 428/64.2
(58) Field of Classification Search ........ 360/135; 428/64.2
See application file for complete search history.

(56) References Cited

U.S. PATENT DOCUMENTS

| | | | |
|---|---|---|---|
| 6,014,296 A * | 1/2000 | Ichihara et al. ........... 360/135 |
| 6,254,966 B1 * | 7/2001 | Kondo ........................ 428/156 |
| 6,324,032 B1 * | 11/2001 | Ohtsuka et al. ............. 360/131 |
| 6,620,532 B2 * | 9/2003 | Aoyama .................. 428/835.5 |
| 6,818,960 B2 * | 11/2004 | Nagai ......................... 257/421 |
| 6,898,031 B1 * | 5/2005 | Belser et al. ................. 360/15 |
| 6,930,057 B2 * | 8/2005 | Saito et al. ................. 438/778 |
| 6,977,108 B2 * | 12/2005 | Hieda et al. ............... 428/64.2 |
| 2003/0179477 A1 * | 9/2003 | Usa et al. ..................... 360/17 |
| 2004/0191577 A1 * | 9/2004 | Suwa et al. ............ 428/694 TP |
| 2005/0243467 A1 * | 11/2005 | Takai et al. ................. 360/135 |
| 2005/0284842 A1 * | 12/2005 | Okawa et al. ................ 216/22 |

FOREIGN PATENT DOCUMENTS

JP A 5-314471 11/1993
JP A 9-231562 9/1997

* cited by examiner

*Primary Examiner*—Jefferson Evans
(74) *Attorney, Agent, or Firm*—Oliff & Berridge, PLC

(57) ABSTRACT

Provided are a manufacturing method for a magnetic recording medium enabling efficient and reliable manufacturing of a magnetic recording medium with minimal surface roughness and good precision in recording and reading information, and a magnetic recording medium with a high degree of surface recording density and good precision in recording and reading information. The magnetic recording medium is constructed by forming a divided recording layer and the like onto a substantially flat base surface of a dummy, such that the base surface side of the dummy serves as a front surface, and a substrate is also attached, after which the dummy is removed.

7 Claims, 13 Drawing Sheets

RECORDING MEDIUM HAVING REDUCED SURFACE ROUGHNESS

BACKGROUND OF THE INVENTION

1. Field of the Invention

The present invention relates to a method of manufacturing a magnetic recording medium, and to a magnetic recording medium.

2. Description of the Related Art

In a magnetic recording medium it is important to make surface roughness extremely minimal in order to increase precision in recording and reading of data. For example, in the case of a hard disk, a floating-type head has become mainstream. In order to obtain good precision in recording and reading, the surface roughness must be extremely minimal and the head flying height must by kept within a small range.

Conventionally, in the manufacturing process for the hard disk or other magnetic recording medium, a front surface of a substrate is polished or otherwise made flat and then a recording layer and then a protective layer and the like are layered onto this substrate by means of a sputtering method. This kept the surface roughness of the overall magnetic recording medium extremely small (e.g., see Japanese Patent Laid-Open Publication Nos. H 5-314471, and H 9-231562).

However, even if the surface of the substrate is made flat, the surface roughness gradually increases in the course of layering the recording layer and the protective layer and the like on top of each other. Ultimately, the surface roughness of the magnetic recording medium overall exceeds a permissible range.

In recent years, in order to improve the surface recording density level, vertical recording type hard disks have increased. In this type of vertical recording hard disk, a soft magnetic layer which is thicker than the recording layer is provided between the substrate and the recording layer, causing the surface roughness of the magnetic recording medium overall to tend to increase.

Furthermore, as one possibility for a magnetic recording medium capable of achieving further increase in surface recording density, much attention is being given to a discreet type magnetic recording medium with a divided recording layer. However, in a discontinuous divided recording layer surface roughness is prone to increase.

By polishing the surface of the divided recording layer using a CMP (Chemical Mechanical polishing) method, it is possible to minimize the surface roughness of the discreet type magnetic recording medium. However, this approach has problems. In actuality, polishing of the thin divided recording layer is difficult to control, and chemical effects of the chemical liquids can cause degeneration of the divided recording layer and deterioration of its magnetic properties. Furthermore, using this type of polishing process reduces manufacturing efficiency.

Furthermore, as the surface recording density is improved the head flying height tends to be small. When the head flying height becomes small, the recording and reading in the magnetic recording medium become much less precise even if the surface roughness is of a size that would not have normally posed a problem conventionally.

The present invention has been made in light of the above-mentioned problems, and it is therefore an object of this invention to provide a method of manufacturing a magnetic recording medium capable of efficiently and reliably manufacturing a magnetic recording medium with little surface roughness and having good precision in recording and reading, and also to provide a magnetic recording medium with high surface recording density and good precision in reading and writing.

SUMMARY OF THE INVENTION

In view of the foregoing problems, various exemplary embodiments of this invention provide a method of manufacturing a magnetic recording medium and a magnetic recording medium wherein forming a recording layer and then a soft magnetic layer and the like onto a substantially flat surface of a dummy, and then attaching a substrate thereto and then removing the dummy. More specifically, in the conventional technique the substantially flat surface of the substrate (which constituted the back surface of the magnetic recording medium being made) served as the base surface and then the soft magnetic layer and the recording layer and the like were then sequentially layered onto this base surface, whereby ultimately the surface of the magnetic recording medium was made flat. In contrast, in the various exemplary embodiments of the present invention, the dummy is arranged on the front surface side of the magnetic recording medium being made, and then the recording layer and the like are sequentially layered onto the substantially flat surface of the dummy, whereby reducing the elements intervening between the base surface and the front surface of the magnetic recording medium as compared to the conventional technique, and thus achieving the magnetic recording medium which is flatter then that of the conventional technique. Thus, the various exemplary embodiments of the present invention have been devised based on a completely different idea from the conventional technique.

In other words, the problems described above are solved by the various exemplary embodiments of the present invention as described below.

(1) A method of manufacturing a magnetic recording medium is characterized by including: a recording layer formation step of forming a recording layer onto a substantially flat base surface of a dummy, with the base surface side serving as a front surface; a substrate attaching step of attaching a substrate onto a back surface side of the recording layer; and a dummy removal step of removing the dummy.

(2) The method of manufacturing a magnetic recording medium according to (1), wherein the dummy is made of silicon material, and the dummy removal step involves dissolving and removing the dummy with an alkali solution.

(3) The method of manufacturing a magnetic recording medium according to (1) or (2), further comprising a protective layer formation step of forming a protective layer for protecting a front surface of the recording layer onto the base surface of the dummy, before the recording layer formation step.

(4) The method of manufacturing a magnetic recording medium according to (3), wherein the protective layer is made of a diamond-like carbon material.

(5) The method of manufacturing a magnetic recording medium according to any one of (1) to (4), further comprising a soft magnetic layer formation step of forming a soft magnetic layer onto the back surface side of the recording layer, between the recording layer formation step and the substrate attaching step.

(6) The method of manufacturing a magnetic recording medium according to (5), further comprising: a recording layer dividing step of forming a groove in the recording layer to divide it into a number of fine recording elements between the recording layer formation step and the soft magnetic layer formation step, and a non-magnetic material filling step of filling a non-magnetic material into at least a part of gaps between the recording elements between the recording layer dividing step and the soft magnetic layer formation step.

(7) The method of manufacturing a magnetic recording medium according to (6), wherein the non-magnetic material is a diamond-like carbon material.

(8) A magnetic recording medium, comprising: a divided recording layer comprising a number of fine recording elements; a soft magnetic layer formed to a back surface of the divided recording layer such that a portion thereof forms a protrusion protruding into a gap between the recording elements; and a non-magnetic material filled into gaps between the recording elements so as to create a separation between the protrusion of the soft magnetic layer and the recording element.

(9) The magnetic recording medium according to (8), wherein the non-magnetic material is formed from up to the back surface side of the divided recording layer, and a protective layer is formed to a front surface side of the divided recording layer, and each recording element is sealed inside the non-magnetic material and the protective layer.

(10) A magnetic recording medium, comprising: a divided recording layer comprising a number of fine divided recording elements; a protective layer formed to a front surface of the divided recording layer; and a non-magnetic material formed in a gap between the recording elements and to a back surface side of the divided recording layer, wherein each recording element is sealed inside the non-magnetic material and the protective layer.

(11) The magnetic recording medium according to any one of (8) to (10), wherein the non-magnetic material and the protective layer are made of the same material.

(12) The magnetic recording medium according to (11), wherein the non-magnetic material and the protective layer are made of a diamond-like carbon.

Note that in the present specification, "diamond-like carbon" (below, "DLC") is used to refer to a material with an amorphous structure which is mainly composed of carbon, and having a hardness of the order of 200 to 8000 kgf/mm$^2$ in Vickers hardness tests.

DETAILED DESCRIPTION OF THE PREFERRED EMBODIMENTS

Hereinafter, a preferable embodiment of the invention will be described in detail with reference to the drawings.

Figure 1:
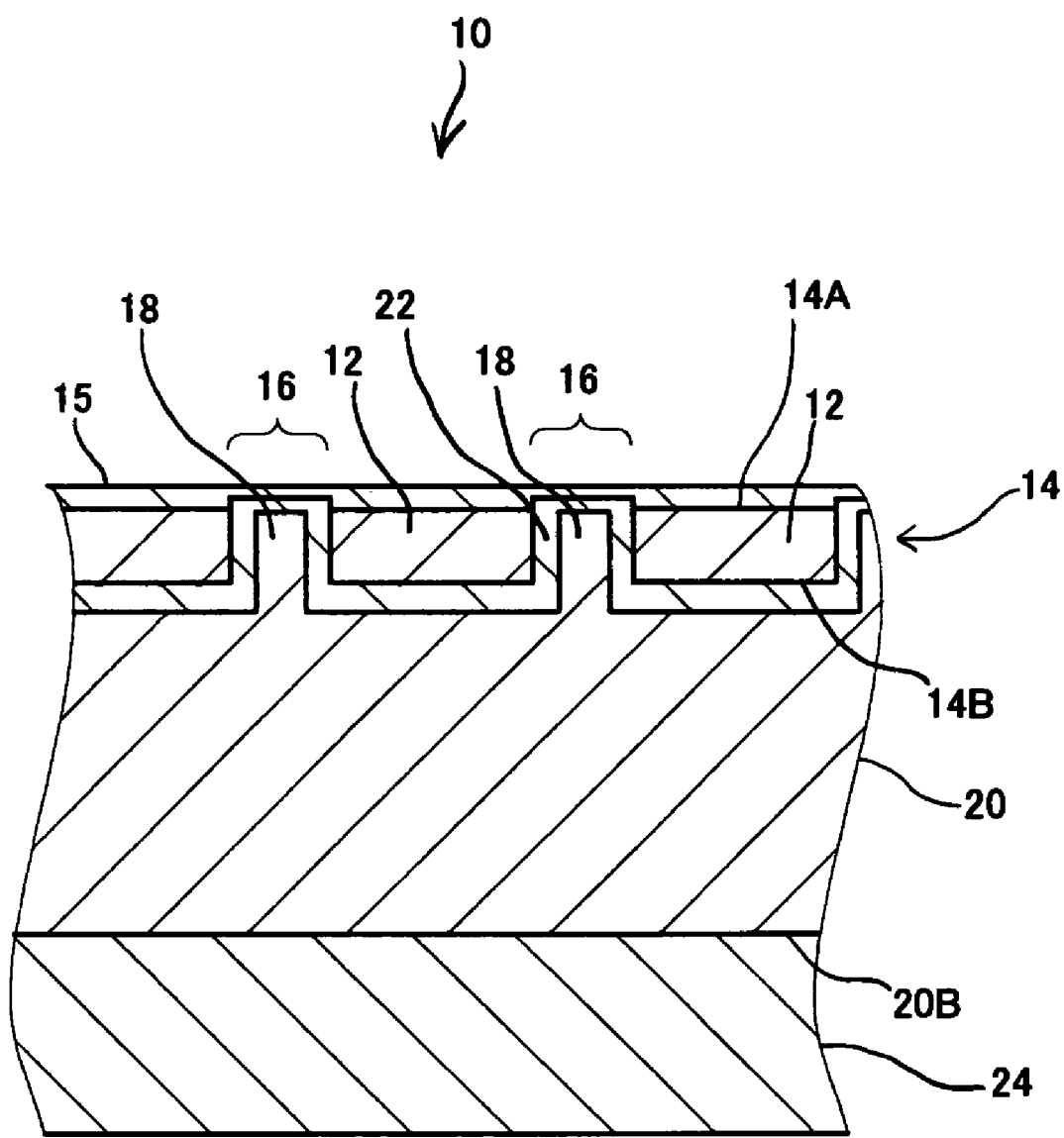
FIG. 1 is a cross-sectional side view schematically showing a structure of a magnetic recording medium in accordance with a first embodiment of the present invention.

FIG. 1 is a cross-sectional side view schematically illustrating a structure of a magnetic recording medium 10 in accordance with a first embodiment.

The magnetic recording medium 10 is a vertical recording discreet type magnetic disk, having: a divided recording layer 14 that includes a plurality of fine divided recording elements 12; a protective layer 15 formed on a front surface 14A side of the divided recording layer 14; a soft magnetic layer 20 formed on a back surface 14B side of the divided recording layer 14 such that a portion thereof forms a protrusion 18 that protrudes in between gaps 16 between the recording elements 12; a non-magnetic material 22 filled into a portion of the gap 16 so as to separate the protrusion 18 of the soft magnetic layer 20 and the recording element 12; and a substrate 24 attached to a back surface 20B side of the soft magnetic layer 20.

The divided recording layer 14 is made of a Co (cobalt) alloy. Each recording element 12 constituting the divided recording layer 14 is sealed inside the protective layer 15 and the non-magnetic material 22.

The protective layer 15 is made of a rigid carbon film material called DLC (mentioned above).

The soft magnetic layer 20 is made of a Fe (iron) alloy or a Co (Cobalt) alloy. The protrusion 18 protrudes out to the vicinity of the protective layer 15.

The non-magnetic material 22 is also made of DLC like the protective layer 15 and is formed as a single body with the protective layer 15. Furthermore, the non-magnetic material 22 is formed out to the back surface 14B side of the divided recording layer 14.

The substrate 24 is made of a glass material.

Next, explanation is made regarding operations of the magnetic recording medium 10.

The magnetic recording medium 10 is the vertical recording discreet type magnetic disk, in which the divided recording layer 14 is divided into a number of fine recording elements 12. Therefore, recording errors and reading errors among the recording elements 12 are unlikely to occur. This enables high surface recording density.

In particular, in addition to the soft magnetic layer 20 serving to strengthen the line of magnetic force along the vertical direction (across the thickness), the protrusion 18 also serves as a shield to obstruct the lines of magnetic force across the horizontal direction (along the direction of the surface) between the recording elements 12. This has a significant effect of reducing recording errors and reading errors among the recording elements 12.

Furthermore, the non-magnetic material 22 is filled into the gaps 16 so as to magnetically separate the recording elements 12 from each other. This also prevents recording errors and reading errors among the recording elements 12.

In other words, in the magnetic recording medium 10, the protrusion 18 of the soft magnetic layer 20 and the non-magnetic material 22 work together to cut off the magnetic force that occurs between the recording elements 12 in the gaps 16, thus producing a significant effect of preventing recording errors and reading errors among the individual recording elements 12.

Furthermore, the recording elements 12 are sealed inside the protective layer 15 and the non-magnetic material 22. This discourages them from degenerating and guarantees stable magnetic properties.

Since the protective layer 15 and the non-magnetic material 22 are made of the same material and are constructed as a single integral unit, the protective layer 15, the non-magnetic material 22, and the recording elements 12 sealed inside these are unlikely to separate from each other. In particular, since the protective layer 15 and the non-magnetic material 22 are made of the DLC material, they exhibit excellent durability, mechanical strength and the like.

In other words, the magnetic recording medium 10 excels in terms of magnetic stability and mechanical stability and is very reliable.

In the magnetic recording medium 10, the non-magnetic material 22 is formed in the gaps 16 and on the back surface 14B side of the recording layer 14, and the recording elements 12 are sealed inside the protective layer 15 and the non-magnetic material 22. However, the present invention is not limited to this embodiment. The non-magnetic material 22 may also be formed just inside the gap 16. In such a case, a portion of the soft magnetic layer 20 protrudes into the gap 16 to form the protrusion 18, whereby the protrusion 18 has an effect of a shield cutting off the magnetic forces amidst the protrusions 18.

On the other hand, in the case where the gaps between the recording elements are completely filled with the non-magnetic material, the protrusion 18 does not have the effect of the shield cutting off the magnetic forces in between the recording elements 12. Nevertheless, if the recording elements are sealed inside the protective layer and the non-magnetic material, then the recording elements, the protective layer, and the non-magnetic material can be prevented from separating from each other and this can achieve an effect of separating the recording elements from the atmosphere and the like and preventing their degeneration.

Furthermore, both the protective layer 15 and the non-magnetic material 22 are made of the DLC material in the magnetic recording medium 10. However, the present invention is not limited to this embodiment, and the protective layer and the non-magnetic material may be made of another non-magnetic material. In order to join the protective layer and the non-magnetic material together in a strong fashion, it is preferable to form them of the same material and as a single, integrated unit.

Next, description is given regarding a method of manufacturing the magnetic recording medium 10.

Figure 2:
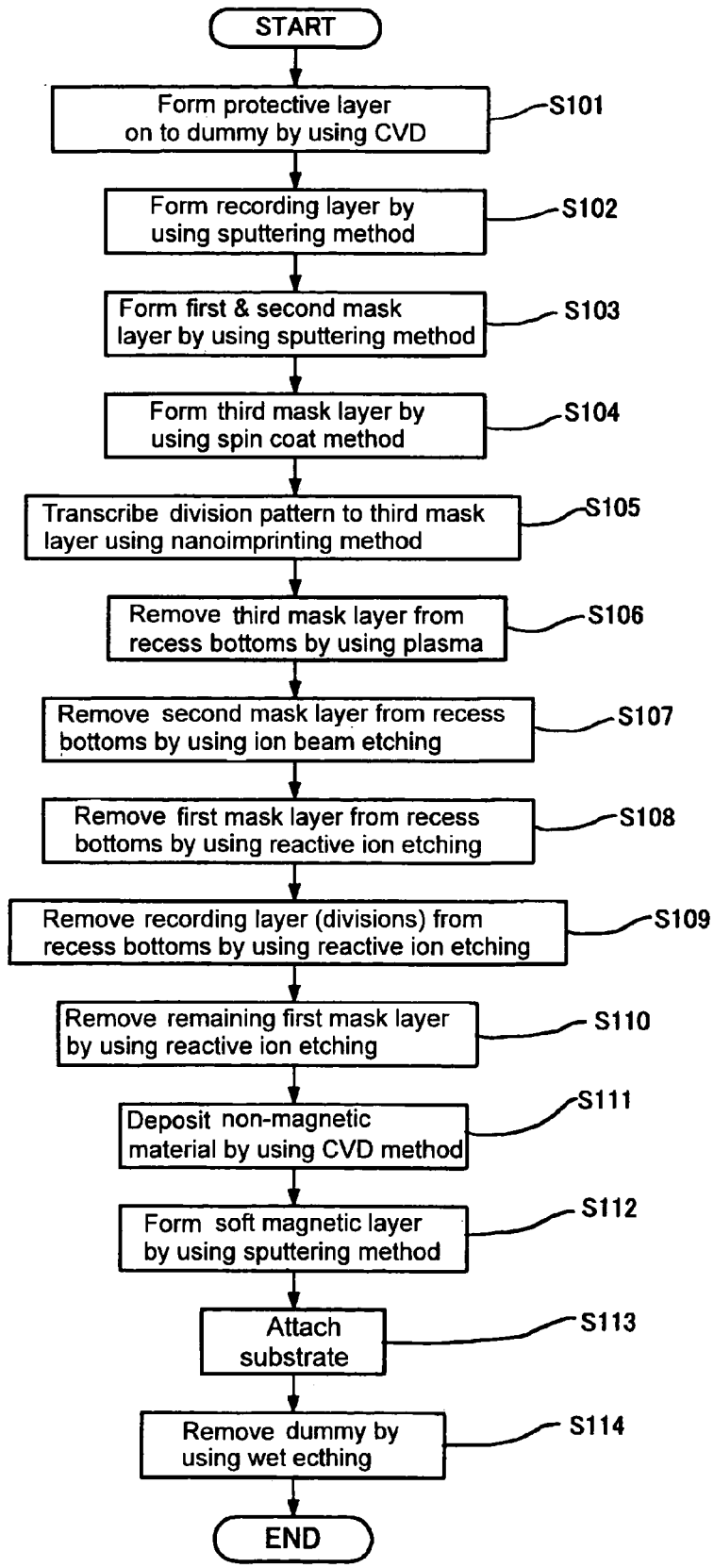
FIG. 2 is a flowchart showing a process of manufacturing the magnetic recording medium.

FIG. 2 is a flowchart showing an outline of processes for manufacturing the magnetic recording medium 10.

Figure 3:
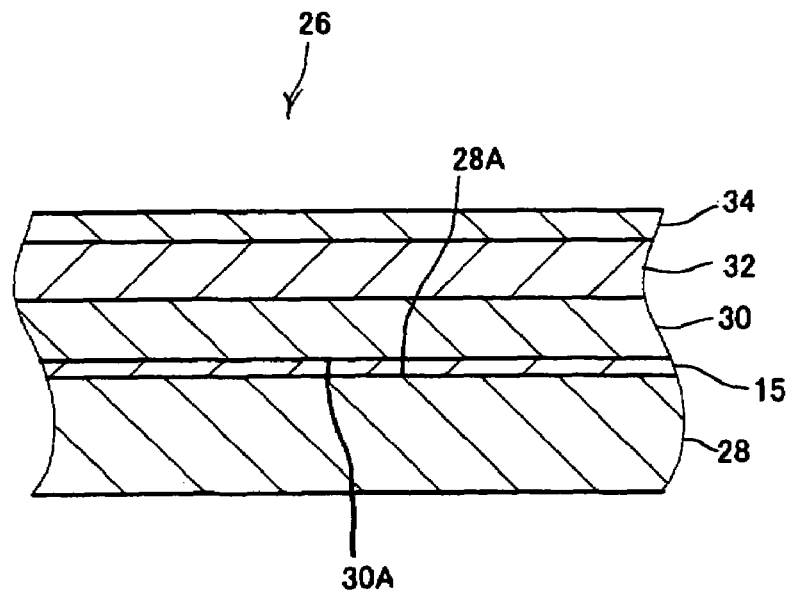
FIG. 3 is a cross-sectional side view schematically showing an intermediary body used in the manufacturing process for the magnetic recording medium.

First, an intermediary body 26 as shown in FIG. 3 is prepared. This intermediary body 26 is obtained by using a CVD (Chemical Vapor Deposition) method to form a 1–5 nm DLC protective layer 15 onto a substantially flat base surface 28A of a dummy 28 (S101). Furthermore, a sputtering method is used to form a 10–30 nm thick continuous recording layer 30 of which the base surface 28A becomes a front surface 30A, and a 10–50 nm thick first mask layer 32 and a 10–30 nm thick second mask layer (S103).

The dummy 28 is a thin, disk-shaped body made of silicon material. The first mask layer 32 is made of TiN (titanium nitride) material, and the second mask layer 34 is made of Ni (nickel) material.

Figure 4:
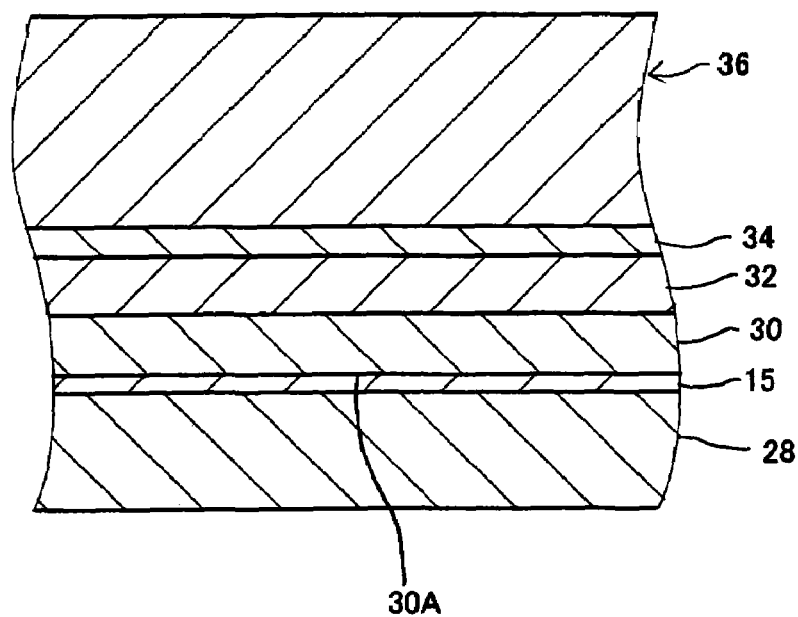
FIG. 4 is a cross-sectional side view schematically showing a shape of the intermediary body after formation of a third mask layer.

Next, as shown in FIG. 4, a spin coat method or a dipping method is used to form a 30–300 nm thick third mask layer 36 onto the second mask layer 34 (S104). The third mask layer 36 is made of a negative resist (NEB 22A made by Sumitomo Chemical Co., Ltd.).

Figure 5:
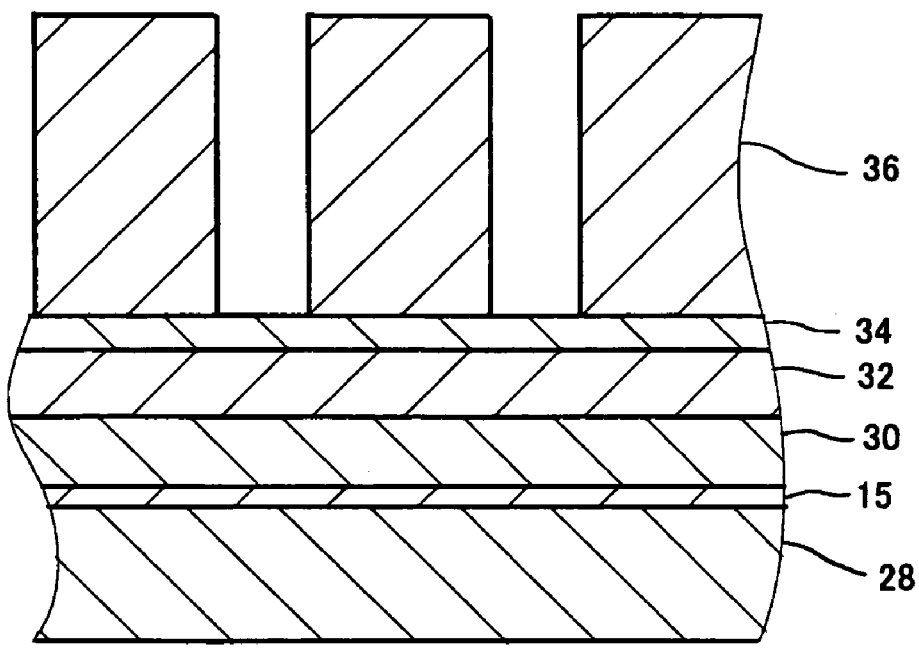
FIG. 5 is a cross-sectional side view schematically showing a shape of the intermediary body after a pattern of divisions has been transcribed onto the third mask layer.

A nanoimprinting method is used to transcribe recesses corresponding to the pattern of divisions in the divided recording layer 14 onto the third mask layer 36 (S105). Then, a plasma with oxygen gas or ozone gas is used to uniformly dry-etch across the entire surface of the third mask layer 36 to remove the third mask layer 36 of the recess bottom as shown in FIG. 5 (S106) so as to expose the second layer 34 at the recess bottom. In the third mask layer 36, areas other than the recesses are also removed by reactive ion etching, but a portion corresponding to the distance between from the recess bottoms remains.

Figure 6:
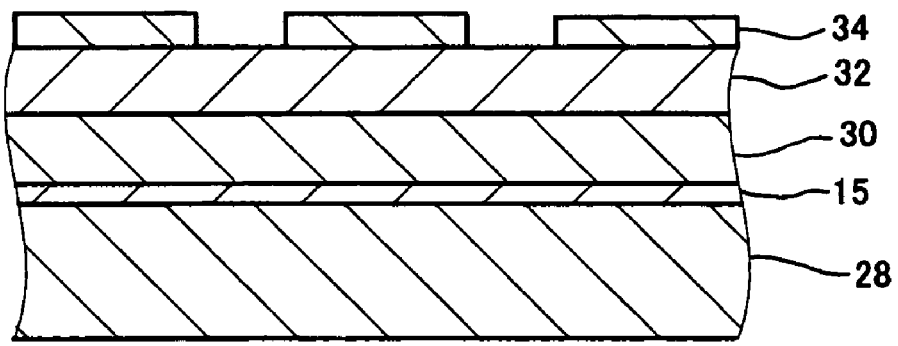
FIG. 6 is a cross-sectional side view schematically showing a shape of the intermediary body after removal of a second mask layer at recess bottoms.

Next, as shown in FIG. 6, the second mask layer 34 of the recess bottoms is removed by ion beam etching using Ar (argon) gas (S107). The third mask layer 36 in areas other than the recesses are also removed for the most part, but small amounts thereof do remain (but these are omitted from the diagram).

Figure 7:
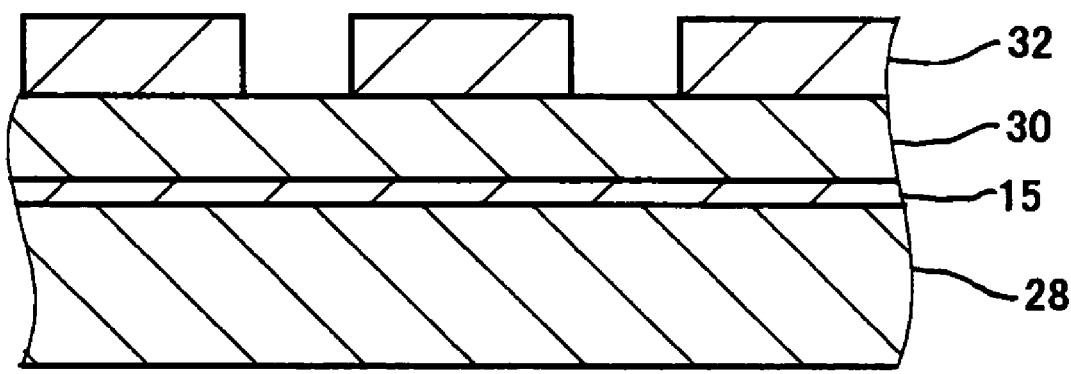
FIG. 7 is a cross-sectional side view schematically showing a shape of an intermediary body after removal of a first mask layer at the recess bottoms.

Then, as shown in FIG. 7, the first mask layer 32 of the recess bottoms is removed by reactive ion etching using $CF_4$ (carbon tetrafluoride) gas or $SF_6$ (sulfur hexafluoride) gas as the reactive gas (S108). Here, the third mask layer 36 in the areas other than the recesses is completely removed. Furthermore, the second mask layer 34 in the areas other than the recesses is removed for the most part, but minute amounts thereof do remain (but these are omitted from the diagram).

Figure 8:
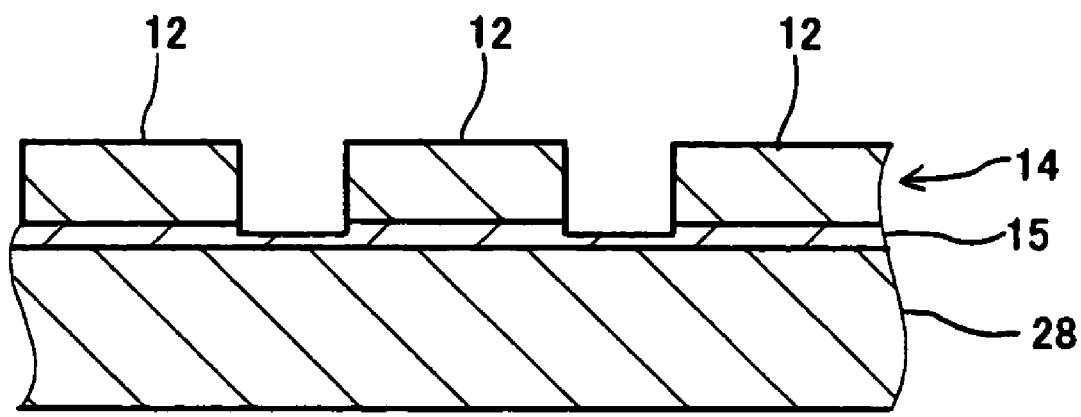
FIG. 8 is a cross-sectional side view schematically showing a shape of the intermediary body after a continuous recording layer and a protective layer have been removed at the recess bottoms, and divided recording elements have been formed.

Then, reactive ion etching using a compound gas made of $NH_3$ (ammonia) gas and CO (carbon monoxide) gas removes the continuous recording layer 30 on the recess bottoms to divide into a number of fine recording elements 12. This forms the divided recording layer 14 as shown in FIG. FIG. 8 (S109). At this point, the protective layer 15 of the recess bottoms is also removed in part, but a small amount thereof does remain on the dummy 28, and thus the dummy 28 does not get exposed.

Furthermore, at this time the second mask layer 34 at areas other than the recesses gets completely removed, but the first mask layer 32 in the areas other than the recesses remains in small amounts on the back surface of the recording elements 12 (this is omitted from the drawings). This first mask layer 32 which is left behind is completely removed by reactive ion etching using $CF_4$ gas or $SF_6$ gas (S110). Furthermore, foreign substances around the recording elements 12 are removed by dry process cleansing or wet process cleansing.

Figure 9:
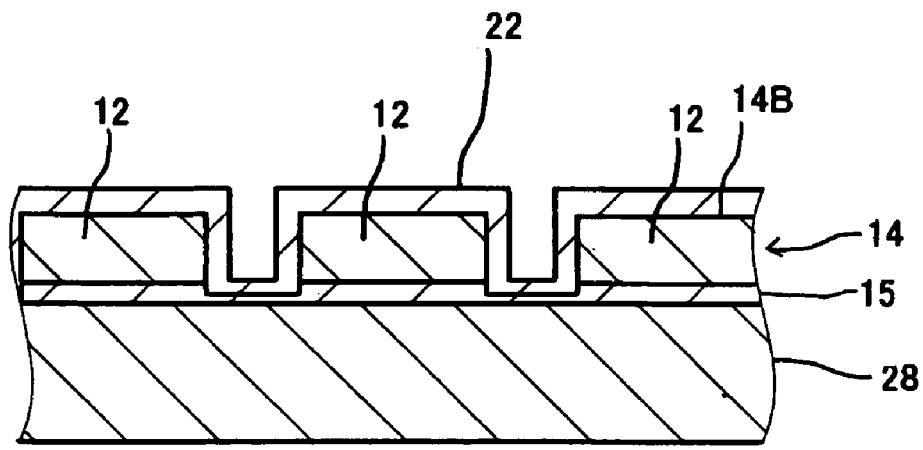
FIG. 9 is a cross-sectional side view schematically showing a shape of the intermediary body after a non-magnetic material has been deposited.

Next, as shown in FIG. 9, the CVD method is used to deposit the 1–30 nm thick DLC non-magnetic material 22 into the gaps between the recording elements 12 (S111). Here, in order to completely cover the recording elements 12 and the gaps 16, the non-magnetic material 22 is deposited onto the back surface 14B side of the divided recording layer 14, along the exposed surfaces of the recording elements 12 and the gaps 16. The gaps 16 are filled in part with the non-magnetic material 22, along the exposed surfaces, and an empty space is left near the center.

A boundary between the non-magnetic material 22 and the protective layer 15 is shown to illustrate the sequence of the processes, but the-non-magnetic material 22 and the protective layer 15 are both made of the same DLC material and are essentially made as a single, integrated unit.

Figure 10:
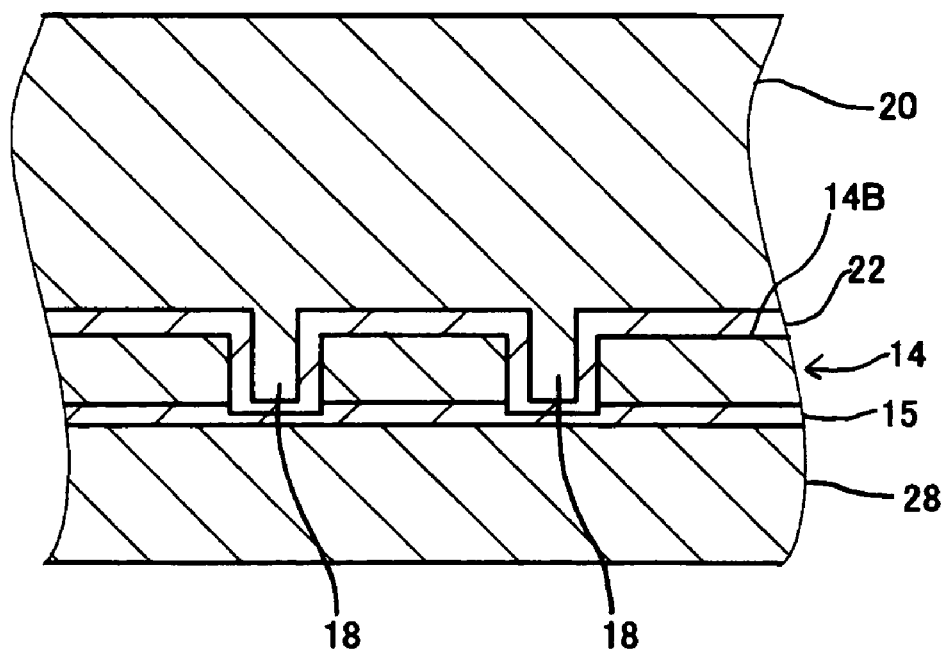
FIG. 10 is a cross-sectional side view schematically showing a shape of the intermediary body after a soft magnetic layer has been formed.

Next, as shown in FIG. 10, the sputtering method is used to form the 50–300 nm thick soft magnetic layer 20 onto the non-magnetic material 22 (the back surface 14B side of the divided recording layer 14) (S112). A portion of the soft magnetic layer 20 fills the empty space in the central vicinity of the gap 16 whereby the protrusion 18 is formed.

Figure 11:
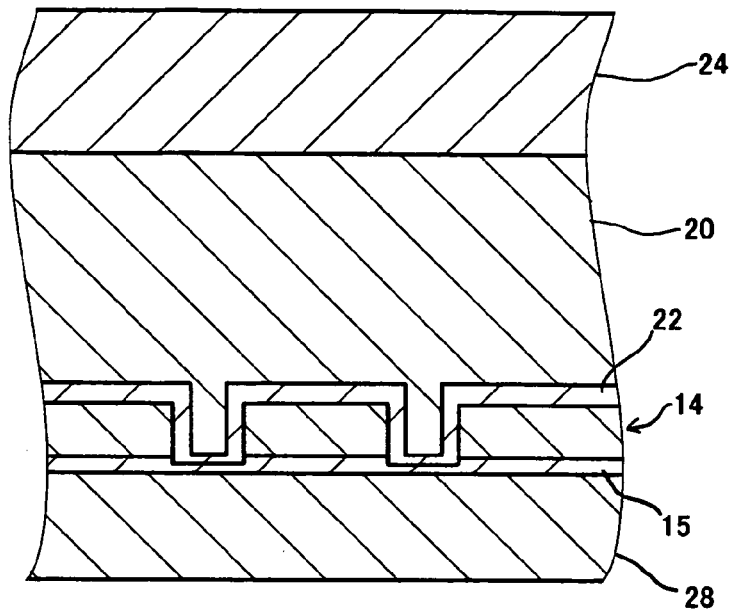
FIG. 11 shows a cross-sectional side view schematically showing a shape of the intermediary body after a substrate has been attached thereto.

Next, as shown in FIG. 11, the substrate 24 is adhered/attached onto the soft magnetic layer 20 (the back surface 14B side of the divided recording layer 14) (S113).

The intermediary body thus attached to the substrate 24 is soaked in alkali etching liquid, and the dummy 28 is dissolved and removed by means of wet etching (S114). Thus, the magnetic recording medium 10 as shown in FIG. 1 is obtained.

At this time, the protective layer 15 and the non-magnetic material 22 protect the divided recording layer 14 from the etching liquid, thus preventing degeneration of the divided recording layer 14.

As needed, the front surface of the protective layer 15 can be coated with, say, a 1–5 nm thick lubricating layer made of PFPE (perfluorinated polyether) material.

In this way, the dummy 28 is arranged on the front surface side of the magnetic recording medium 10 which is to be made. The protective layer 15, the recording layer 14 and then the soft magnetic layer 20 are sequentially layered onto the substantially flat surface 28A of the dummy 28 to make the magnetic recording medium 10. This enables a reduction of elements intervening between the base surface 28A and the front surface of the magnetic recording medium 10, whereby the magnetic recording medium with the flat front surface can be manufactured in a more sure manner than in the conventional technique.

Furthermore, like the substantially flat base surface 28A of the dummy 28, the magnetic recording medium 10 can also be made so that its front surface roughness is sufficiently minimal. Therefore, CMP or other such flattening processing becomes unnecessary, and the method of manufacturing the magnetic recording medium in accordance with the present embodiment can be performed with good manufacturing efficiency and low cost.

Next, description is given regarding a second embodiment of the present invention.

Figure 12:
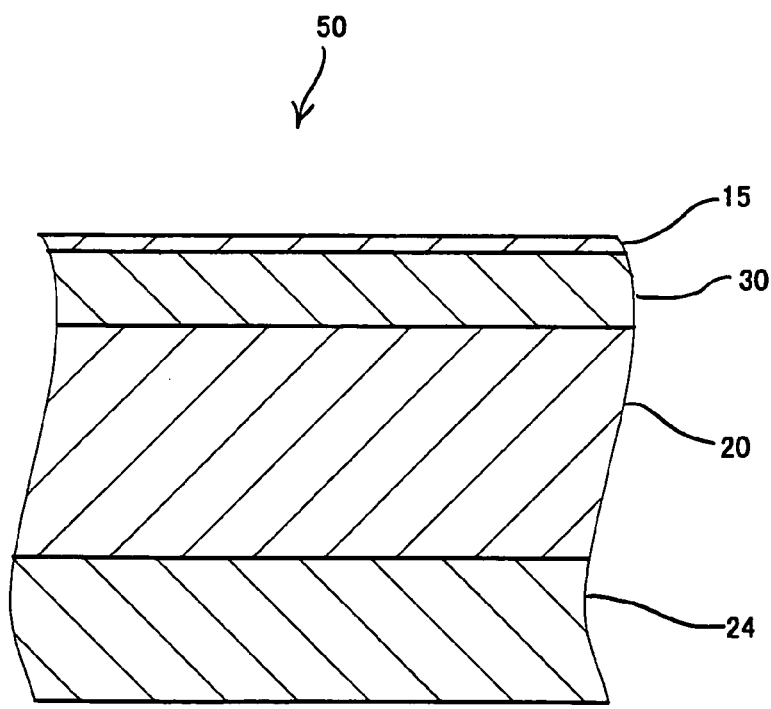
FIG. 12 shows a cross-sectional side view schematically showing a structure of a magnetic recording medium in accordance with a second embodiment of the present invention.

As shown in FIG. 12, in the second embodiment a non-discreet type vertical recording magnetic recording medium having a soft magnetic layer is manufactured by applying the manufacturing method for the magnetic recording medium that utilizes the dummy portion. The second embodiment has many common points with the first embodiment in terms of the structure of the magnetic recording medium and the process of manufacturing it. Therefore, similar structures are indicated by the same reference numbers as in the first embodiment, and explanations are omitted where appropriate.

A magnetic recording medium 50 is constructed first with the substrate 24, then the soft magnetic layer 20, and then the continuous recording layer 30 and then the protective layer 15.

Figure 13:
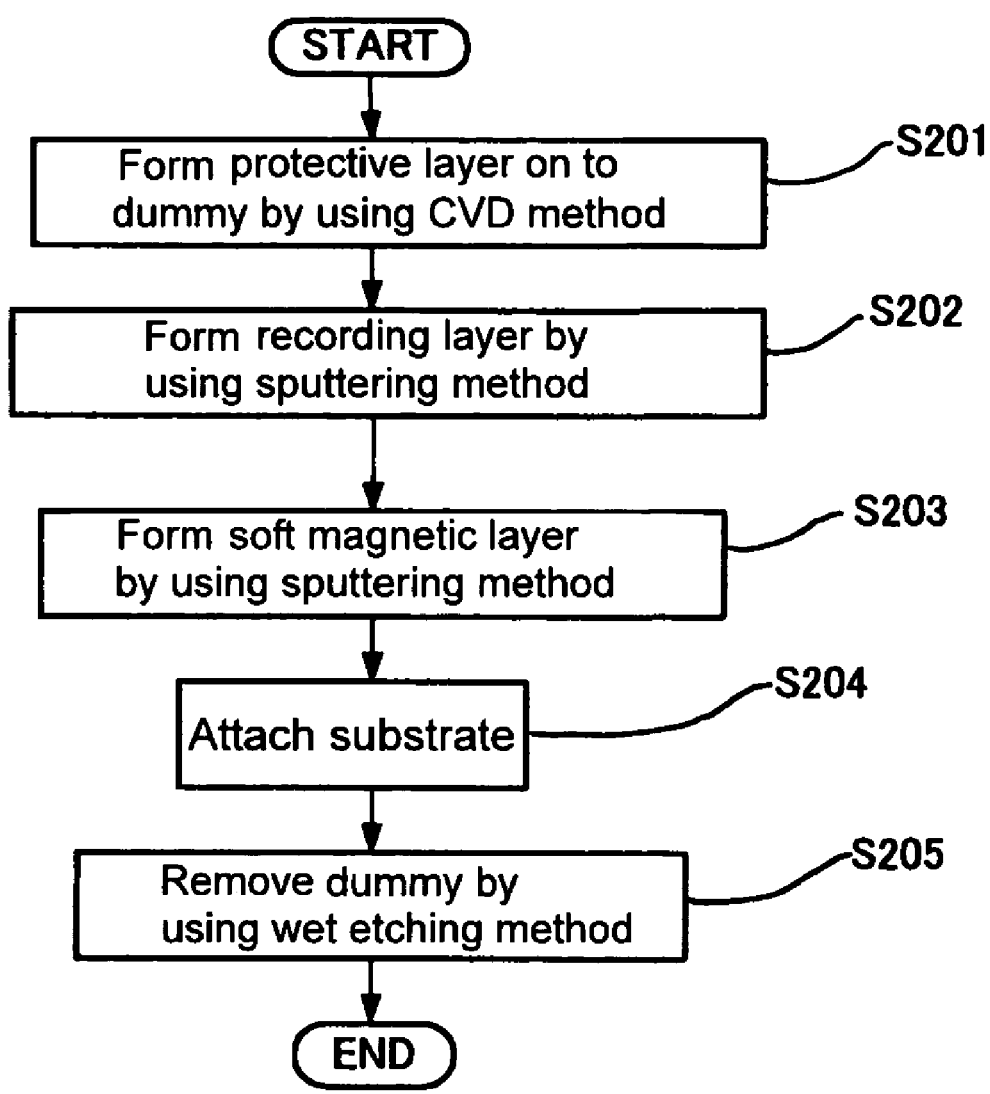
FIG. 13 is a flowchart showing a process of manufacturing a non-discreet type magnetic recording medium in accordance with the second embodiment of the present invention.

FIG. 13 is a flowchart showing an outline of processes of manufacturing the magnetic recording medium 50.

The magnetic recording medium 50 is formed by placing the protective layer 15 onto the base surface 28A of the dummy 28 (S201), and then forming the continuous recording layer 30 (S202) and then the soft magnetic layer 20 (S203). Furthermore, the substrate 24 is attached to the soft magnetic layer 20 (the back surface side of the continuous recording layer 30) (S204) and the dummy 28 is removed by performing wet etching (S205).

The second embodiment also has an effect of reducing the surface roughness of the magnetic recording medium 50, enabling increased precision in recording and reading information.

Next, description is given regarding a third embodiment of the present invention.

The third embodiment has a magnetic recording medium which is similar to the discreet type, and which is the vertical recording type with the continuous recording layer. In order to manufacture this, the manufacturing method for the magnetic recording medium utilizing the dummy is used. The third embodiment also has many points in common with the first embodiment in terms of structure of the magnetic recording medium and the processes for manufacturing it. These similar structures are indicated by the same reference numbers as in the first embodiment, and explanations are omitted where appropriate.

A magnetic recording medium 60 is formed first with the substrate 24, and then the soft magnetic layer 20 having the protrusions 18 protruding to the front surface side at minute spacing intervals, and then a recording layer 62, and then the protective layer 15.

The recording layer 62 is formed similarly to the uneven shape of the front surface of the soft magnetic layer 20, and a gap 64 is formed in a front surface 62A side and is filled with a non-magnetic material 66. The front surface 62A of the recording layer 62 protrudes slightly more than the front surface 66A of the non-magnetic material 66.

While the front surface 15A of the protective layer 15 is flat, the back surface 15B side is formed with minute steps, similarly to the front surface 62A of the recording layer 62 and the front surface 66A of the non-magnetic material 66.

Next, simple explanation is given regarding a method for manufacturing the magnetic recording medium 60.

Figure 15:
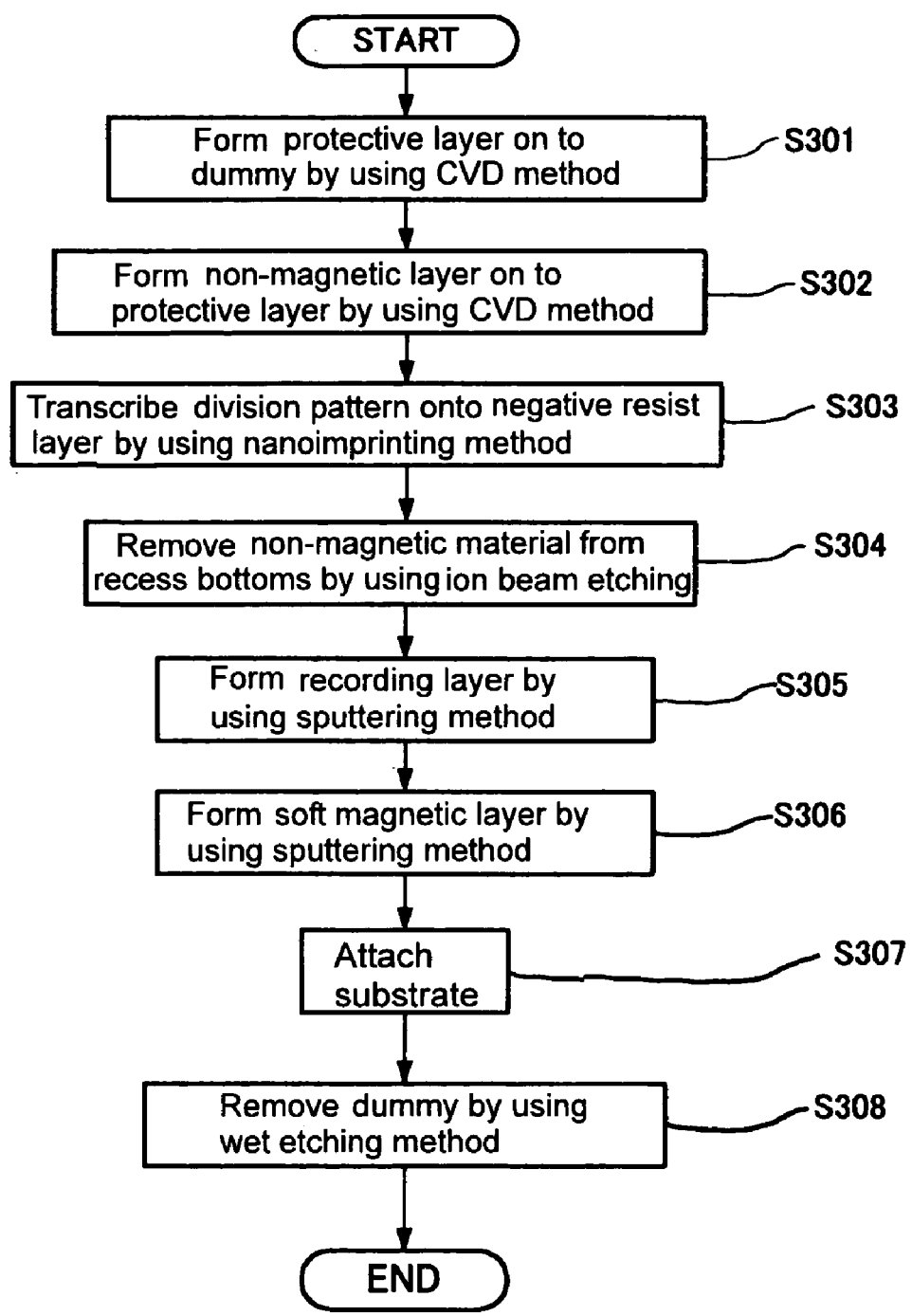
FIG. 15 is a flowchart showing a process of manufacturing the magnetic recording medium.

FIG. 15 is a flowchart showing an outline of a process for manufacturing the magnetic recording medium 60.

Figure 16:
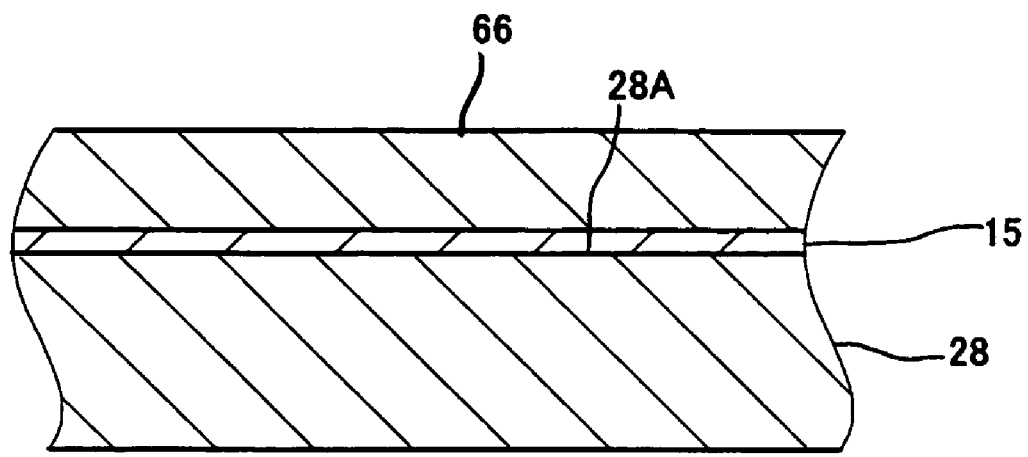
FIG. 16 is a cross-sectional side view schematically showing a structure of an intermediary body used in the manufacturing process for the magnetic recording medium.

First, as shown in FIG. 16, the CVD method is used to form the 1–5 nm thick protective layer 15 made of DLC onto the base surface 28A of the dummy 28 (S301). Furthermore, the CVD method is also used to form the 10–30 nm thick non-magnetic material 66 (S302). Further, a negative resist layer (not shown) is made onto the non-magnetic material 66 by using a spin coat method or a dipping method.

Figure 17:
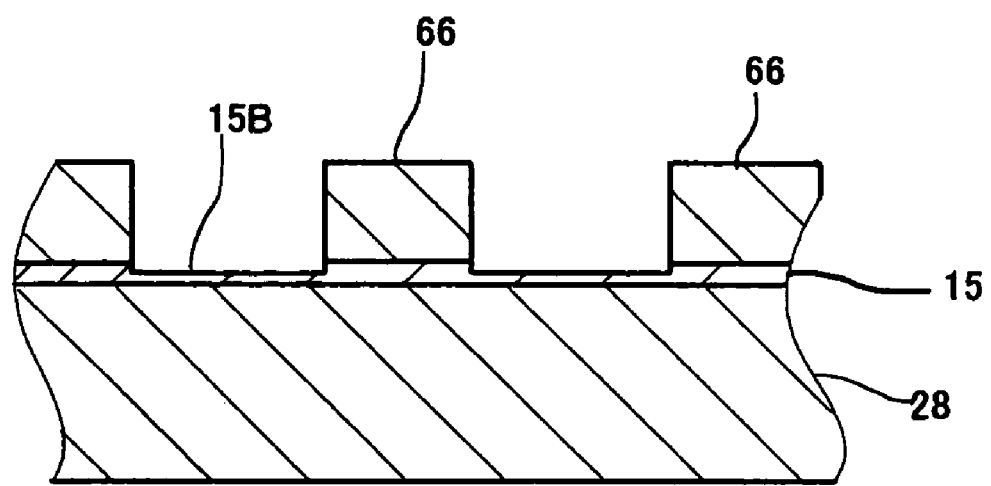
FIG. 17 is a cross-sectional side view schematically showing a shape of the intermediary body after a non-magnetic material has been divided.

Next, the nanoimprinting method is used to transcribe a recess corresponding to the recess of the recording layer 62 onto the negative resist layer (S303). Using plasma with oxygen gas or ozone gas, the negative resist layer is dry etched uniformly across its entire surface, so as to remove the negative resist layer of the recess bottoms and create the division(s). Next, ion beam etching using Ar (argon) gas removes the non-magnetic material 66 of the recess bottoms as shown in FIG. 17 and creates the division(s) (S304). When this occurs, the protective layer 15 of the recess bottoms is also removed just a little bit so as to create a minute step on the back surface 15B side of the protective layer 15. However, the dummy 28 is not exposed at the recess bottoms.

Figure 18:
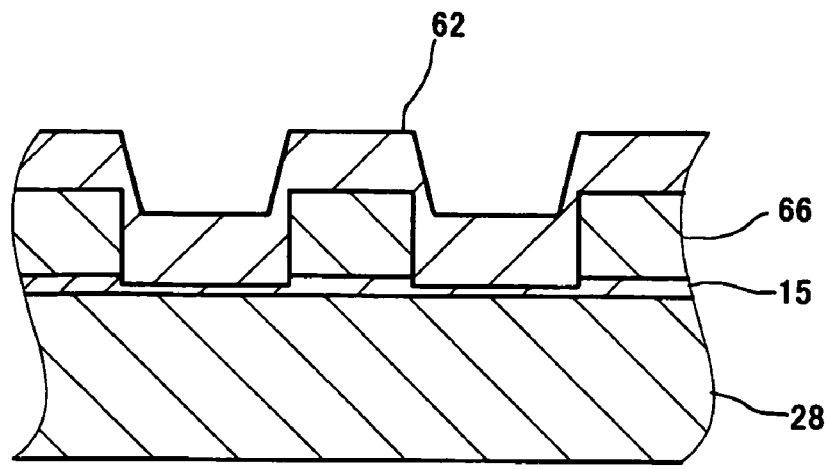
FIG. 18 is a cross-sectional side view schematically showing a shape of the intermediary body after a recording layer has been formed.

Next, the sputtering method is used to form a 10–30 nm thick recording layer 62 such as shown in FIG. 18 (S305). The gap in the non-magnetic material 66 in the recording layer 62 is filled while the recording layer 62 is formed substantially in the shape of a cross-section of a wave similarly to the uneven shape of the non-magnetic material 66.

Figure 19:
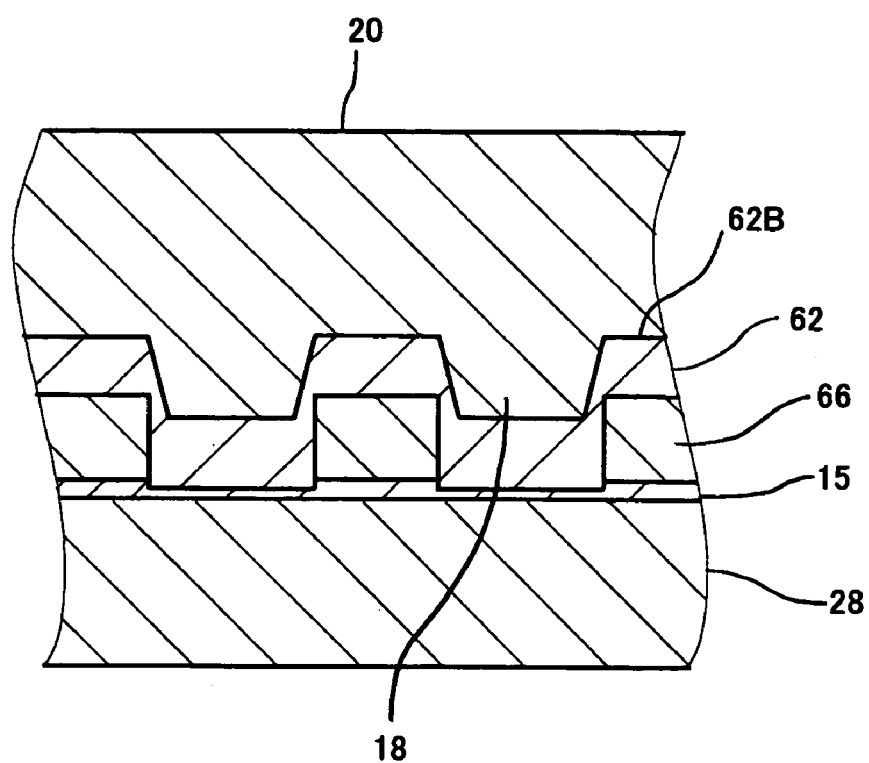
FIG. 19 is a cross-sectional side view schematically showing a shape of the intermediary body after a soft magnetic layer has been formed.

Next, as shown in FIG. 19, the sputtering method is used to form a 50–300 nm thick soft magnetic layer 20 onto the back surface 62B side of the recording layer 62 (S306). In a portion of the soft magnetic layer 20, a recess on the back surface 62B side of the recording layer 62 is filled so as to form the protrusion 18.

Figure 20:
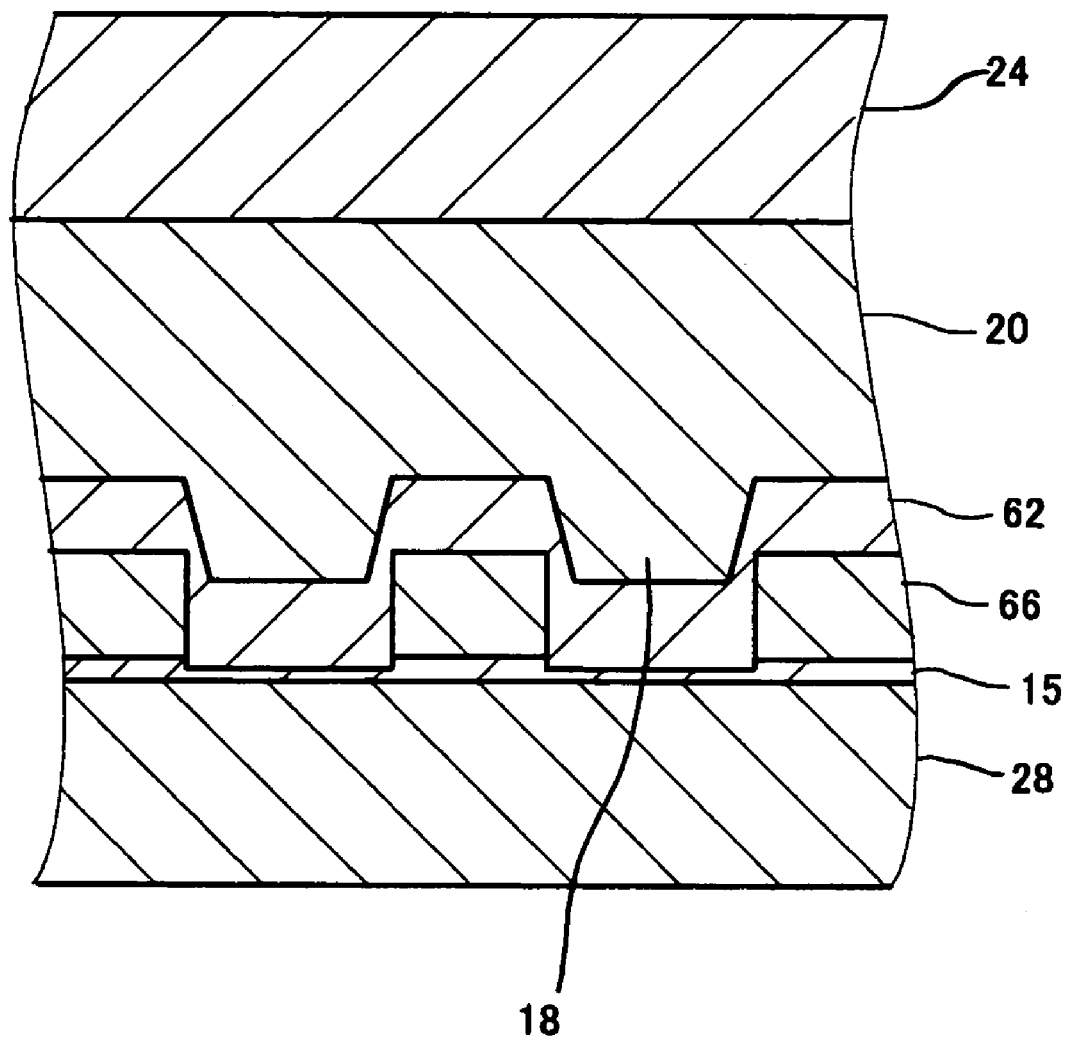
FIG. 20 is a cross-sectional side view schematically showing a shape of the intermediary body after a substrate has been attached thereto.

Next, as shown in FIG. 20, the substrate 24 is adhered/attached to the back surface side of the soft magnetic layer 20 (S307).

Figure 14:
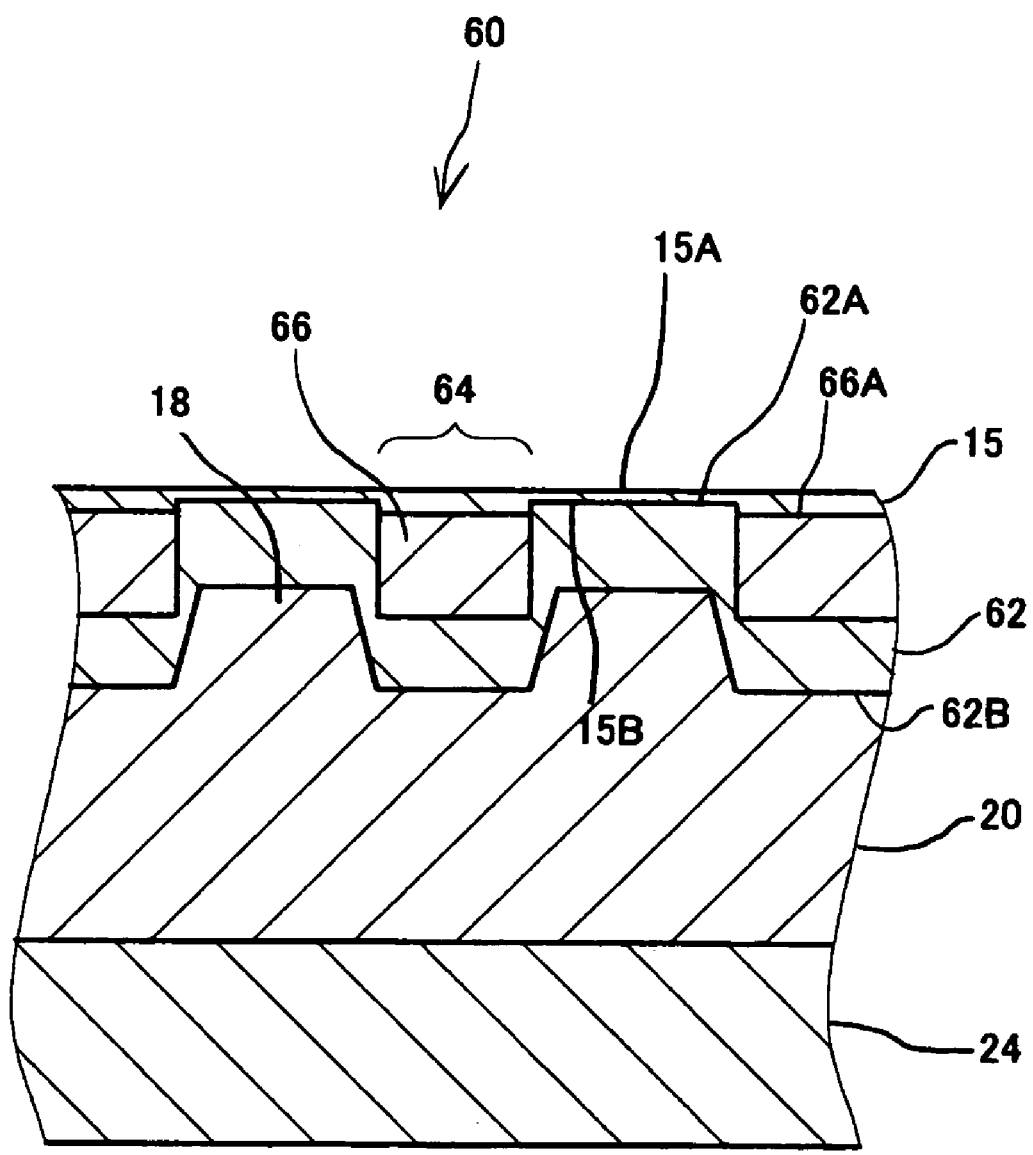
FIG. 14 is a cross-sectional side view schematically showing a structure of a magnetic recording medium in accordance with a third embodiment of the present invention.

As described above, the intermediary body which is attached to the substrate 24 is soaked in alkali etching liquid, and wet etching is used to dissolve and remove the dummy 28 (S308) to obtain the magnetic recording medium 60 such as shown in FIG. 14.

As needed, the front surface of the protective layer 15 can be coated with, for example, a 1–5 nm thick lubricating layer made of PFPE (perfluorinated polyether) material.

In the third embodiment, just as in the first and second embodiments, the dummy 28 is arranged on the front surface side of the magnetic recording medium 60 which is to be made, and the protective layer 15, the recording layer 62, and then the soft magnetic layer 20 are sequentially layered onto the substantially flat surface 28A of the dummy 28. This enables a reduction of elements intervening between the base surface 28A and the front surface of the magnetic recording medium 10, whereby the magnetic recording medium with the flat front surface can be manufactured in a more sure manner than in the conventional technique.

Further, by dividing the non-magnetic material 66 before forming the recording layer 62, the recording layer 62 can be formed in the desired shape, and it becomes unnecessary to perform the dry etching to process each of the mask layers, or the reactive ion etching processing (using CO gas or the like as the reactive gas) to create the magnetic recording layer with the divisions. This reduces equipment costs and enables good manufacturing efficiency.

Here, the magnetic recording medium 60 is formed with the recording layer 62 formed as an integral, continuous unit. However, it is also possible to perform, for example, CMP flattening processing or the like between the process to form the recording layer (S305) and the process to form the soft magnetic layer (S306), to flatten the back surface side of the recording layer 62 and the non-magnetic material 66 while creating the divisions in the recording layer 62, thus creating a completely discreet type magnetic recording medium.

In the first embodiment, three types of mask layers made of different materials are formed and the divisions are created in the continuous recording layer 30 by using a 4-stage dry etching process. However, as long as the divisions can be created with a high degree of precision in the continuous recording layer 30, there are no particular restrictions as to the variety of dry etching, the material used to make the mask layer, the number of mask layers stacked on top of each other, the thickness of the mask layer, or the like.

In the first embodiment described above, the first mask layer 32 was formed directly to the back surface of the continuous recording layer 30. However, It is also possible to form an orienting layer made of CoO, MgO, NiO or the like to the back surface of the continuous recording layer 30, and then form each of the mask layers on top of this orienting layer. Adopting this sort of structure raises the orientational capacity of the continuous recording layer 30.

Furthermore, in the first to third embodiments, the substrate 24 is attached directly to the soft magnetic layer 20. However, the present invention is not limited to this arrangement. It is also possible to form an underlayer made of Cr (Chrome) or a Cr alloy or the like between the soft magnetic layer 20 and the substrate.

Further, in the first to third embodiments, the protective layer 15 is formed between the dummy 28 and the divided recording layer 14, and when the wet etching is performed to remove the dummy 28 the protective layer 15 protects the divided recording layer 14 from the etching liquid. However, the present invention is not limited to this arrangement. When using etching liquid which does not work chemically on magnetic materials, it is also possible to form the divided recording layer 14 directly onto the dummy 28 and then remove the dummy 28 by performing wet etching. In this case, after performing the wet etching, a protective layer may be formed to the front surface 14A of the divided recording layer 14.

In the first to third embodiments, the dummy 28 is the thin disk-shaped unit. However, the present invention is not limited to this arrangement. As long as it has the substantially flat base surface, there are no particular restrictions as to the shape of the dummy. However, in order to increase the efficiency of the process for removing the dummy with wet etching, a thin flat unit is preferably used for the dummy.

Furthermore, in the first to third embodiments, the dummy 28 was made of silicon material. However, the present invention is not limited to this arrangement. As long as it can be removed by dissolving it or other process, there are no particular restrictions as to the material of the dummy portion.

In the first to third embodiments, the wet etching technique is used to remove the dummy 28. However, the present invention is not limited to this arrangement. As long as the dummy can be removed without damaging the flatness of the front surface of the magnetic recording medium, it is sufficient if the dummy can be peeled away and removed. Thus, it is sufficient if the dummy can be removed by dry etching.

In the first embodiment, the magnetic recording medium 10 was the discreet type magnetic disk with the recording element arranged in rows at minute intervals along the radial direction of the track. However, the present invention is not limited to this arrangement. Even when manufacturing a magnetic disk with the recording elements arranged at minute intervals in rows along a peripheral direction (the direction of the sectors), or when manufacturing a magnetic disk with the recording elements arranged at minute intervals in lines along both the radial direction and the peripheral direction, or when manufacturing a magnetic disk with the recording elements arranged in a spiral pattern, the manufacturing method of the present invention can be used with any kind of magnetic disk to manufacture the magnetic recording medium with the flatter surface than was available in the conventional technique, without performing polishing work.

Furthermore, in the second embodiment the magnetic recording medium 50 was the non-discreet type vertical recording magnetic recording medium having the soft magnetic layer 20. However, the present invention is not limited to this arrangement. The present invention can also be applied in the manufacture of a non-discreet type longitudinal recording magnetic disk, so as to obtain the effect of reducing the surface roughness of the magnetic disk and increase the precision level of recording and reading information.

EXAMPLE 1

The surface roughness of the vertical recording discreet type magnetic recording medium 10 obtained in the first embodiment was measured as:

Ra=0.7 nm

Rmax=7.0 nm

Comparative Example 1

Another magnetic recording medium was created against which to compare the example 1. This other magnetic recording medium was created by forming the soft magnetic layer and then the recording layer onto the substrate, and then working the recording layer to create the divisions before filling the non-magnetic material in between the recording elements. Then, (after performing the CMP) the protective layer was formed. The surface roughness of this other magnetic recording disk was measured as:

Ra=1.2 nm

Rmax=10.2 nm.

In other words, this confirms that the surface roughness is reduced by 40% or more in the magnetic recording disk obtained in the first embodiment of the present invention, as compared to the magnetic recording disk used in the comparative example 1.

EXAMPLE 2

The surface roughness of the non-discreet type vertical recording magnetic recording medium 50 obtained in the second embodiment was measured as:

Ra=0.2 nm

Rmax=2.5 nm.

Comparative Example 2

Another magnetic recording medium was created against which to compare the example 2. This other magnetic recording medium was created by forming the soft magnetic layer and then the recording layer onto the substrate, and then forming the protective layer to obtain the non-discreet type vertical recording magnetic recording disk. The surface roughness of this other magnetic recording disk was measured as:

Ra=0.5 nm

Rmax=6.9 nm.

In other words, this confirms that the surface roughness is reduced by 60% or more in the magnetic recording disk obtained in the second embodiment of the present invention, as compared to the magnetic recording disk used in the comparative example 2.

As explained above, the present invention provides a superior effect of enabling efficient and reliable production of the magnetic recording medium in which surface roughness is minimal and good precision is obtained in recording and reading information.

What is claimed is:

1. A magnetic recording medium, comprising:
a divided recording layer comprising recording elements;
a soft magnetic layer formed to a back surface of the divided recording layer such that a portion thereof forms a protrusion protruding into a gap between the recording elements; and
a non-magnetic material filled into gaps between the recording elements so as to create a separation between the protrusion of the soft magnetic layer and the recording element.

2. The magnetic recording medium according to claim 1, wherein
the non-magnetic material is formed from up to the back surface side of the divided recording layer, and a protective layer is formed to a front surface side of the divided recording layer, and each recording element is sealed inside the non-magnetic material and the protective layer.

3. The magnetic recording medium according to claim 2, wherein
the non-magnetic material and the protective layer are made of the same material.

4. The magnetic recording medium according to claim 3, wherein
the non-magnetic material and the protective layer are made of a diamond-like carbon.

5. A magnetic recording medium, comprising:
a divided recording layer comprising divided recording elements;
a protective layer formed to a front surface of the divided recording layer; and
a non-magnetic material formed in a gap between the recording elements and to a back surface side of the divided recording layer,
wherein each recording element is sealed inside the non-magnetic material and the protective layer, and
the non-magnetic material and the protective layer are made of the same material.

6. A magnetic recording medium, comprising:
a divided recording layer comprising recording elements;
a non-magnetic material formed in a gap between the recording elements; and
a protective layer formed over a front surface of the recording element and a front surface of the non-magnetic material,
wherein a part of the protective layer over the recording element is thinner than a part of the protective layer over the non-magnetic material.

7. The magnetic recording medium according to claim 6, wherein
the front surface of the recording element is protruded to a front side more than the front surface of the non-magnetic material.

* * * * *